United States Patent [19]

Kim

[11] Patent Number: 5,684,546
[45] Date of Patent: Nov. 4, 1997

[54] ELECTROSTATIC DISCHARGE PROTECTIVE CIRCUIT IN A LIQUID CRYSTAL DISPLAY

[75] Inventor: Dong-gyu Kim, Suwon, Rep. of Korea

[73] Assignee: Samsung Electronics Co., Ltd., Suwon, Rep. of Korea

[21] Appl. No.: 539,906

[22] Filed: Oct. 6, 1995

[30] Foreign Application Priority Data

Oct. 6, 1994 [KR] Rep. of Korea .................. 94-25571

[51] Int. Cl.⁶ .................................................. G02F 1/1345
[52] U.S. Cl. ............................... 349/40; 349/73; 349/139
[58] Field of Search ................................. 359/54, 36, 87, 359/88, 83, 62; 361/56, 58, 91, 111; 257/452; 349/40, 73, 139, 149, 152

[56] References Cited

U.S. PATENT DOCUMENTS 5,233,448  8/1993  Wu ............................................. 359/59

FOREIGN PATENT DOCUMENTS 55-4034  1/1980  Japan ........................................ 359/62

*Primary Examiner*—William L. Sikes
*Assistant Examiner*—Tai V. Duong
*Attorney, Agent, or Firm*—Cushman Darby & Cushman, IP Group of Pillsbury Madison & Sutro LLP

[57] ABSTRACT

Disclosed is an electrostatic discharge protective circuit in a liquid crystal display having a plurality of cells in a substrate, wherein a short-circuit area which can be cut off at the same time of the cell-cutting process is comprised of first lines for connecting respective facing pads of two adjacent cells; second lines for connecting the first lines in series array, and short-circuiting the entire first lines; and a third line for connecting the short-circuiting lines.

7 Claims, 3 Drawing Sheets

5,684,546

ELECTROSTATIC DISCHARGE PROTECTIVE CIRCUIT IN A LIQUID CRYSTAL DISPLAY

BACKGROUND OF THE INVENTION

The present invention relates in general to an active matrix liquid crystal display having an improved electrostatic discharge protective circuit.

DESCRIPTION OF THE PRIOR ART

At present, the demand for planer displays is increasing, especially because of the demand for the process development of updated display systems such as HDTV. In particular, a liquid crystal display (LCD) which is a typical planer display device, meets the requirements of less power consumtion, high speed and a color picture. These requirements have been important issues in electro luminescence elements, vacuum fluorescence displays and plasma display panels. LCDs have been applied widely to lap top computers and pocket computers requiring small sized displays which are light weight and exhibit low power consumption. In addition, LCDs are used as the color TV screen mounted in cars.

LCDs having the extensive uses mentioned above are divided into two types, passive and active. The former controls each pixel using passive components, and thus it is superior to the active type in speed, viewing angle and contrast. For these reasons, it is a suitable display for HDTV requiring of high resolution of above some 1,000,000 pixels.

The active matrix display is a display in which active elements are added to respective pixels to supply a sensitive threshold value to the liquid crystal. In addition, it maintains cell voltage uniformly to reduce crosstalk.

A thin film transistor which uses the active matrix method is fabricated by detecting the scanning electrode of the gate bus corresponding to the scanning line, turning on all of the transistor on the same bus, connecting the drain bus to the hold circuit for providing the signal with each capacitor, and inputting the data as potential to the liquid crystal of each pixel. When turning on the transistor, the signal applied as in the above-mentioned way is maintained at a prior state of inputting the data, and then synchronizes the liquid crystal until scanning the next frame.

In the TFT-LCD, a plurality of TFT elements and an LCD cell may be arrayed in a substrate. In this case, however, there may occur ESD on the pad for mounting the respective lines and tape carrier package (TCP).

The amount of electrostatic voltage generated on the pad is on the order of hundreds to thousands of volts even for a small-capacity display. When the electrostatic charge is transferred to the lines through the pads, the TFT characteristic may be degraded or interlayer short-circuiting may result. To reduce these destructive effects, the prior art manufacturing process includes a short-circuit area which is eventually to short-circuited, where the short-circuit lines of the address and data lines are connected to short-circuit electrodes, but prior to completion of the LCD, the short-circuiting area is cut off.

Hereinafter an ESD protective circuit of a typical prior art LCD is described in detail with figures appended.

A monolithic layout of a prior art LCD is described below with reference to FIGS. 1 and 2.

First, an outline in which respective cells will be sited is defined within a TFT array substrate 18 having the size of 300 mm+400 mm. Partition lines 4 are provided between the respective cells to divide each cell. In each cell, short-circuit cutting line 3, to be cut off prior to applying a TCP within the LCD, is provided. A plurality of TCP bonding pads 2 are provided at the inside of short-circuit cutting line 3. An image displaying line 1 is provided within upper substrate line 6.

FIG. 2 is a diagram of a prior art ESD protective circuit of an LCD before the cutting step to divide each cell.

As shown in this figure, to prevent ESD damage from the TCP bonding pads, a short-circuit area is made in such a manner that the respective lines connected to the respective TCP bonding pads are connected to each other using the same metal resistance or nonlinear resistance element.

Thus, formed short-circuit area 5 is cut off, just prior to the TCP mounting step.

However, in the prior art ESD protective circuit of an LCD before the cutting step to divide each cell, the additional short-circuit area corresponding to a space between the short-circuit cutting line 3 and the partition of the adjacent cells is needed, since each end of the lines is used for connecting to each ICP bonding pad 2 to construct the short-circuit area 5.

SUMMARY OF THE INVENTION

It is an object of the present invention to solve the above-mention problems of the prior art.

Another object is to provide an electrostatic discharge protective circuit in a liquid crystal display having a plurality of cells in a substrate, wherein a short-circuit area which can be cut off at the same time of the cell-cutting process is comprised of first lines for connecting respective facing pads of two adjacent cells; second lines for connecting the first lines in series array, and short-circuiting all of the first lines; and a third line for connecting adjacent short-circuit areas comprising the first and second lines.

DETAILED DESCRIPTION OF THE PREFERRED EMBODIMENTS

A preferred embodiment of the present invention is described below with reference to the accompanying drawings.

Figure 1:
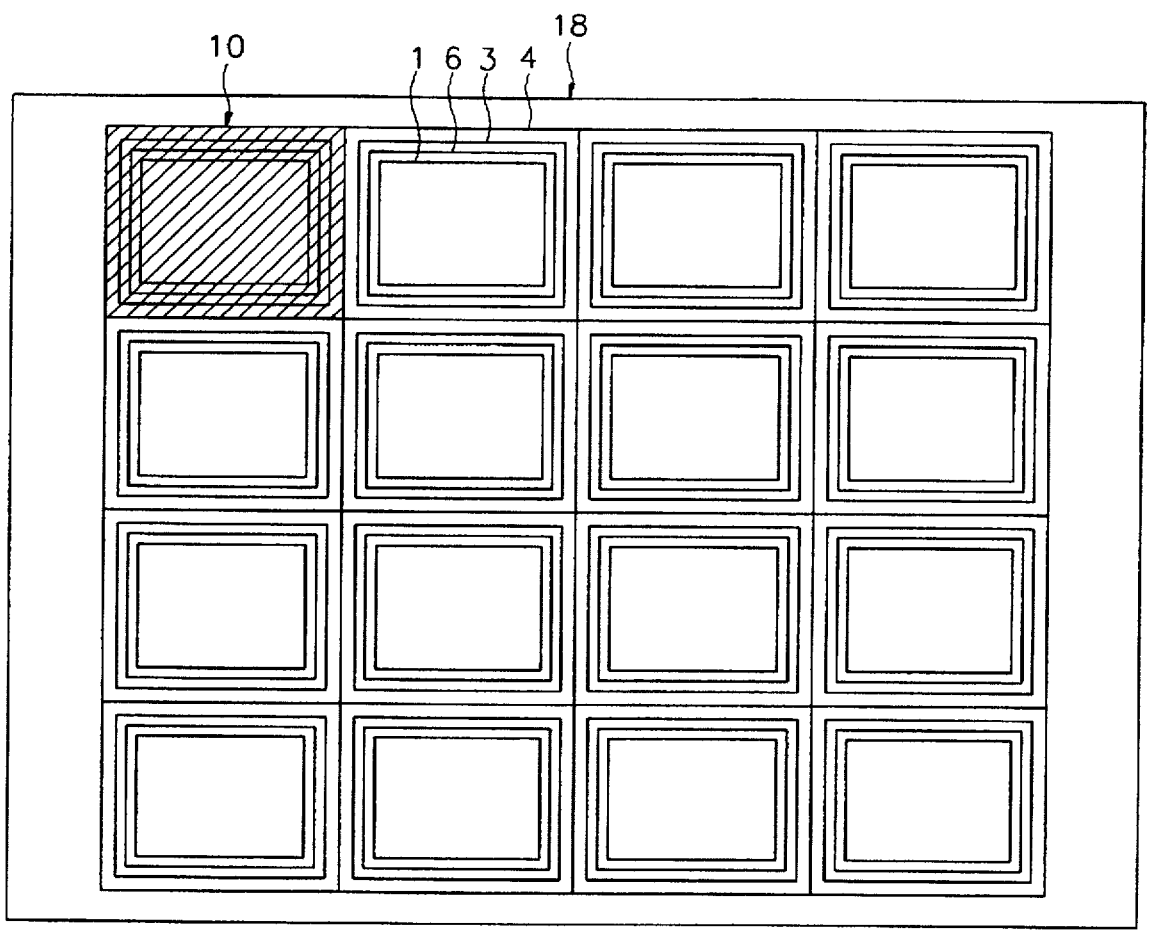
FIG. 1 is a monolithic layout of a typical prior art LCD.
Figure 2:
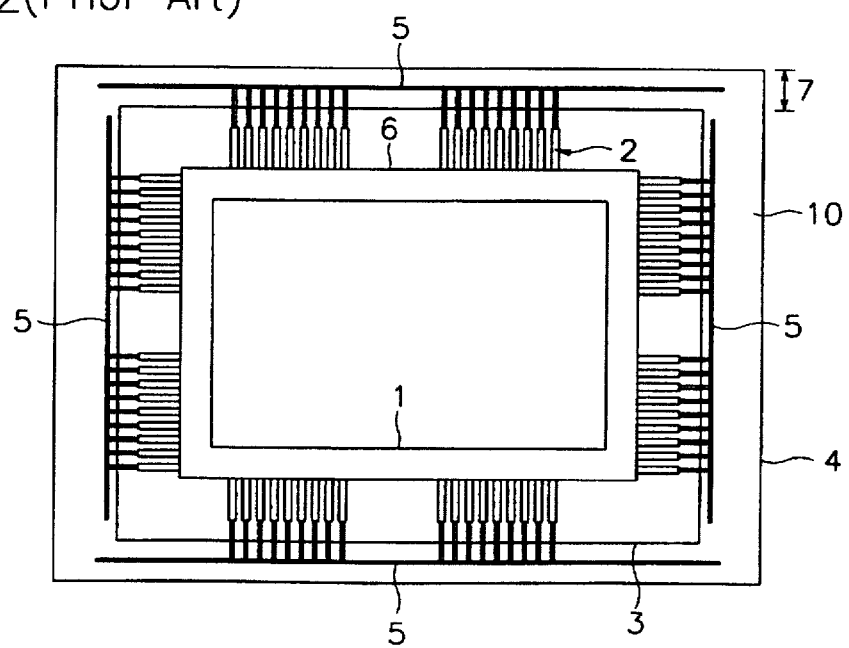
FIG. 2 is a diagram of an ESD protective separate circuit of an LCD before the cutting step to divide prior art cells.
Figure 3:
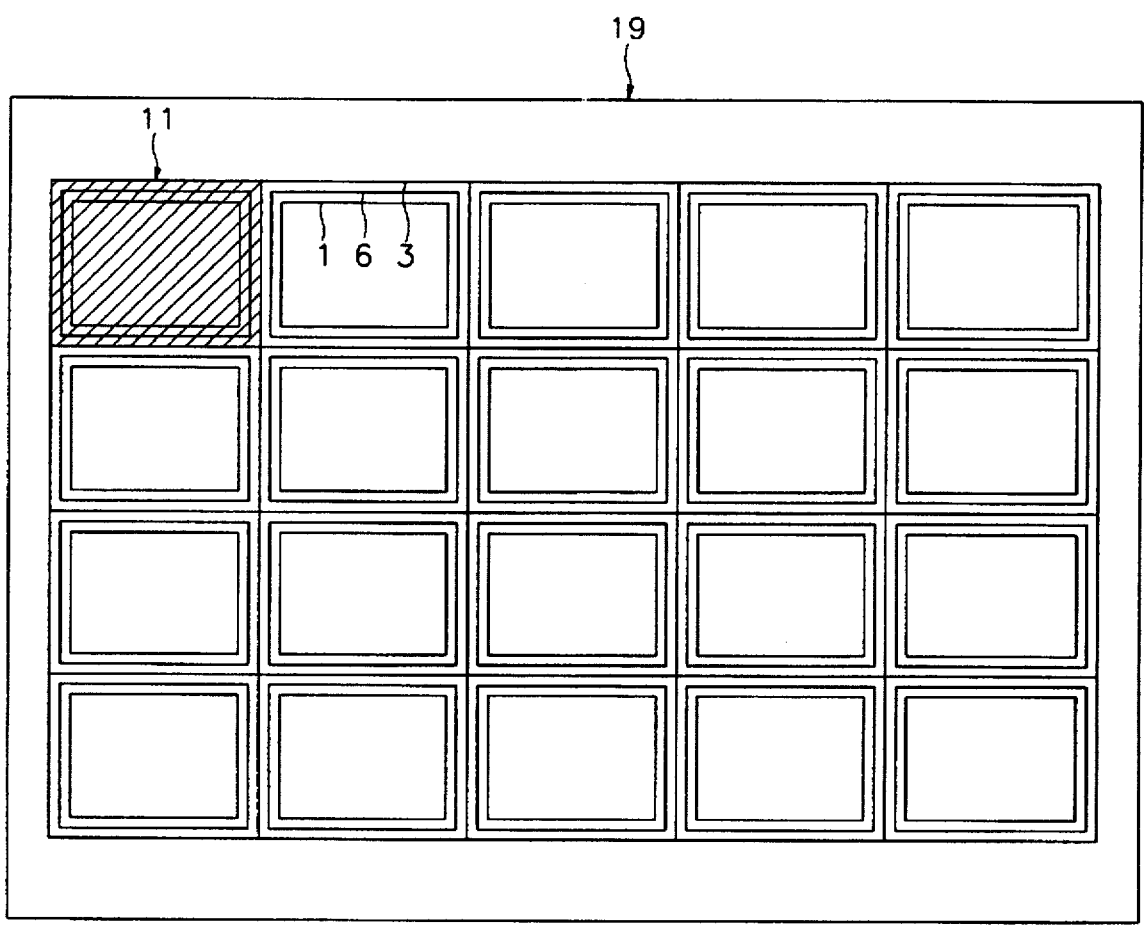
FIG. 3 is a monolithic layout of an LCD according to the present invention.
Figure 4:
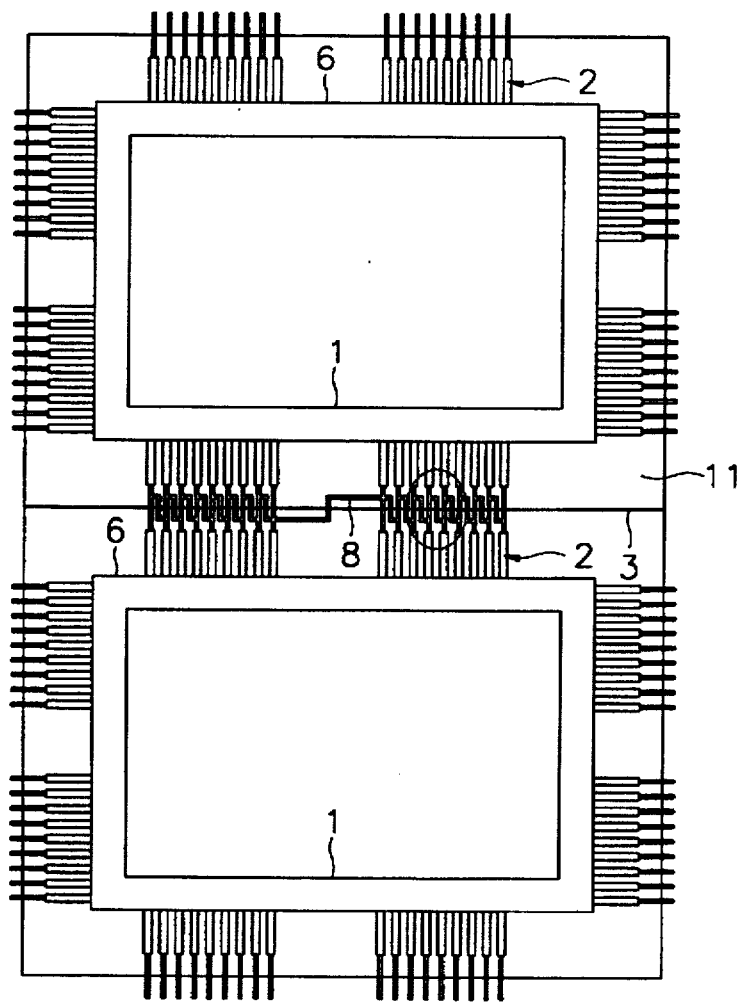
FIG. 4 is a diagram of an ESD protective separate circuit of an LCD before the cutting step to divide cells, according to the present invention.

FIG. 3 is a monolithic layout of an LCD according to the present invention and FIG. 4 is a diagram of an ESD protective circuit of the LCD before the cutting step to divide cells of the present invention.

Figure 5:
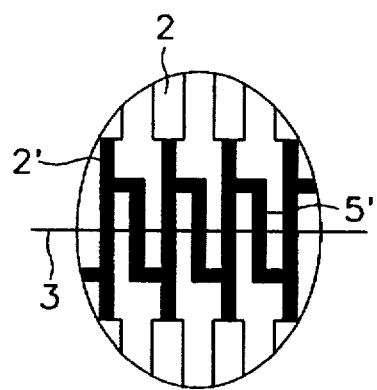
FIG. 5 is a detailed diagram of an ESD protective seperate circuit of an LCD before the cutting step to divide cells, according to the present invention.

As shown in FIGS. 4 and 5, according to an embodiment of the present invention, the ESD protective circuit in a liquid crystal display having a plurality of cells in a substrate, wherein a short circuit area which can be cut off at the same time of the cell-cutting process is comprised of first lines 2' for connecting respective facing pads 2 of two adjacent cells 11 and second lines 5' for connecting the first lines in series array, and short-circuiting all of the first lines. A third line 8 is used for connecting adjacent short-circuiting areas.

The short-circuit areas exist during the process of manufacturing the LCD to reduce the electrostatic charge from the TCP bonding pad 2, but they are seperated from the cell at the final step for bonding the TCP. The short-circuit areas are formed between lines connected to the TCP bonding pads 2, respectively, and makes short each line. If this state is maintained during the entire process, the ESD damage can be considerably reduced. It is necessary to cut the short-circuit areas, where the TCP should be applied, from the cell 11 using the short-circuit seperation line 3. This cutting, however, increases the occupation area of the cell 11 within the glass substrate, thus resulting in decrease of the acceptable cell number in the glass substrate 18.

For this reason, this invention is constructed so no short-circuit area is cut to decrease the occupation area of the cell 11 within the substrate 19 and increase the acceptable cell number in the substrate.

Figure 6:
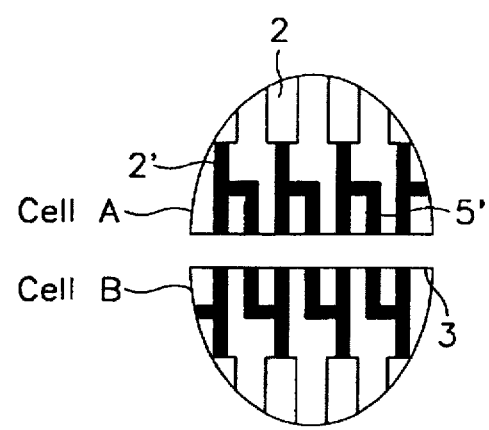
FIG. 6 is a detailed diagram of an ESD protective separate circuit of an LCD after the cutting step to divide cells, according to the present invention.

As shown in FIGS. 5 and 6, Z-shaped lines 5' are provided between the lines 2' for connecting each TCP bonding pad 2 of each cell 11, in series array. Besides, there is a line 8 for connecting two short-circuit areas with a relative large space therebetween, so that all of the connection lines 2' can be short-circuited at the same time.

The Z-shaped line 5' short-circuit each connection lines 2' as shown in FIG. 5. At this state, when divided each cell by cutting the short-circuit cutting line 3, as shown in FIG. 6, the short-circuit areas are cut at the same time. That is, the simplification of the manufacturing process is available since an additional process of for cutting the short-circuit areas is not required.

What is claimed is:

1. An electrostatic discharge protective circuit in a liquid crystal display having a plurality of cells in a substrate, wherein a plurality of short-circuit areas having a short circuit cutting line can be cut off at the same time of the cell-cutting process, comprising:

first lines for connecting respective facing pads of two adjacent cells; and second lines for connecting two adjacent said first lines by crossing the short-circuiting cutting line.

2. An electrostatic discharge protective circuit of claim 1, wherein respective first lines are connected by one of said second lines using a same conducting material for said first and second lines.

3. An electrostatic discharge protective circuit of claim 1, wherein a respective one of said second lines connects two first lines by connecting the upper portion of the left-positioned first line to the lower portion of the right-positioned first line.

4. An electrostatic discharge protective circuit of claim 1, wherein said second line between said two adjacent first lines is made of a Z-shaped line, and short-circuits said two adjacent first lines.

5. An electrostatic discharge protective circuit of claim 1, further comprising a third line connecting adjacent short circuit areas of said plurality of short circuit areas.

6. An electrostatic discharge protective circuit of claim 1, wherein said third line connects a crossed portion of the left-positioned first and second lines to a crossed portion of the right-positioned first and second lines with a somewhat large space therebetween.

7. An electrosatic discharge protective circuit of claim 6, wherein the third line turns 90 twice at the middle, across a cell-cutting line vertically.

\* \* \* \* \*